United States Patent [19]

Fischer et al.

[11] Patent Number: 4,667,801

[45] Date of Patent: May 26, 1987

[54] CLUTCH DISC ARRANGEMENT

[75] Inventors: Matthias Fischer, Euerbach; Peter Wiggen, Grafenrheinfeld; Rainer Ziss, Schwanfeld, all of Fed. Rep. of Germany

[73] Assignee: Fichtel & Sachs AG, Schweinfurt, Fed. Rep. of Germany

[21] Appl. No.: 799,443

[22] Filed: Nov. 19, 1985

[30] Foreign Application Priority Data

Nov. 22, 1984 [DE] Fed. Rep. of Germany ... 8434106[U]

[51] Int. Cl.$^4$ ............................................. F16D 3/14
[52] U.S. Cl. .............................. 192/106.2; 192/70.18
[58] Field of Search ............... 192/106.2, 106.1, 70.18, 192/70.17, 70.16

[56] References Cited

U.S. PATENT DOCUMENTS 3,974,903 8/1976 de Gennes ..................... 192/106.2
4,493,408 1/1985 Nagano ............................ 192/106.2

FOREIGN PATENT DOCUMENTS 2029356 1/1972 Fed. Rep. of Germany .
1398365 6/1975 United Kingdom .
1398454 6/1975 United Kingdom .
2085552 4/1982 United Kingdom .

Primary Examiner—Richard J. Scanlan, Jr.
Attorney, Agent, or Firm—Toren, McGeady & Goldberg

[57] ABSTRACT

A cluch disc of a motor vehicle clutch comprises a clutch disc hub and a hub flange integral therewith. The hub flange is provided with a plurality of coherent windows each of which receives both a helical compression spring and an interconnection bolt interconnecting the cover plates of the clutch disc which are angularly movably mounted on the clutch disc hub. The window is closed at its radially outer side by an uninterrupted web.

6 Claims, 3 Drawing Figures

CLUTCH DISC ARRANGEMENT

BACKGROUND OF THE INVENTION

Clutch discs for motor vehicle clutches comprise a clutch disc hub and a hub flange integral with the clutch disc hub. Cover plates are mounted on both sides of the hub flange for angular movement about the axis of the hub disc. Helical compression springs are housed in windows of the hub flange and of the cover plates for circumferentially supporting the cover plates against rotation about the axis with respect to the hub flange. The cover plates are interconnected by bolts. These bolts cooperate with terminal edges of recesses for limiting the angular movement of the cover plates with respect to the hub flange. The clutch disc is mounted by its hub on an input shaft of a gear box. One of the cover plates is provided with friction linings for engagement with a clutch housing and a pressure plate of the clutch which are both mounted on an output shaft of an internal combustion engine.

STATEMENT OF THE PRIOR ART

A hub flange with a clutch disc of the abovestated style of construction is known by way of example from German Patent No. 2,029,356. When this known hub flange is used in a clutch disc with torsional vibration damper it is possible in an especially simple manner to generate a spring characteristic curve which proceeds in each case straight over the entire traction and overrun range and has a lower spring rigidity in the overrun range. By traction range is to be understood the range of relative movement of the hub flange and the cover plates which occurs when the engine is transmitting a torque through the clutch to the gear box for driving the vehicle, and by overrun range is to be understood the relative movement of the hub flange and the cover plates which occurs when a torque is transmitted from the gear box to the engine through the clutch such as to brake down the speed of the vehicle by the action of the engine.

In the prior art device the hub flange is provided with a coherent recess comprising a spring-receiving recess area and a bolt-receiving recess area. The coherent recess is open in radially outward direction.

OBJECT OF THE INVENTION

The object of the present invention is to modify the known hub flange in the most simple and spacesaving possible manner such as to have increased performance and more particularly to have increased rigidity.

SUMMARY OF THE INVENTION

In view of the above objects a clutch disc arrangement comprises a clutch disc hub having an axis. A hub flange is integral with the clutch disc hub. Two cover plates are mounted on both sides respectively of the hub flange for angular movement about the axis. A pair of axially aligned cover plate windows is provided in respective cover plates. A helical compression spring is located within the cover plate windows in a position substantially tangential with respect to the axis and engages by its ends substantially radially extending terminal edges of the cover plate windows. A spring-receiving hub flange recess accommodates the helical compression spring and has a first substantially radially extending lateral edge adjacent one end of the helical compression spring in the unloaded condition of the hub disc arrangement and a second lateral edge being spaced from the opposite end of the helical compression spring in the unloaded condition. At least one substantially axially extending interconnection bolt interconnects the cover plates. A bolt-receiving hub flange recess is provided in the hub flange adjacent the second lateral edge of the spring-receiving hub flange recess and accommodates the interconnection bolt such as to establish with the interconnection bolt angular movement limiting means. The bolt-receiving hub flange recess is coherent with the spring-receiving hub flange recess within the hub flange. The spring-receiving hub flange recess and the bolt-receiving hub flange recess define a peripherally closed hub flange window which is at the radially outer side thereof closed by a radially outer, circumferentially uninterrupted web.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The invention will now be explained in greater detail by reference to an example of embodiment, wherein.

DESCRIPTION OF THE PREFERRED EMBODIMENT

Figure 1:
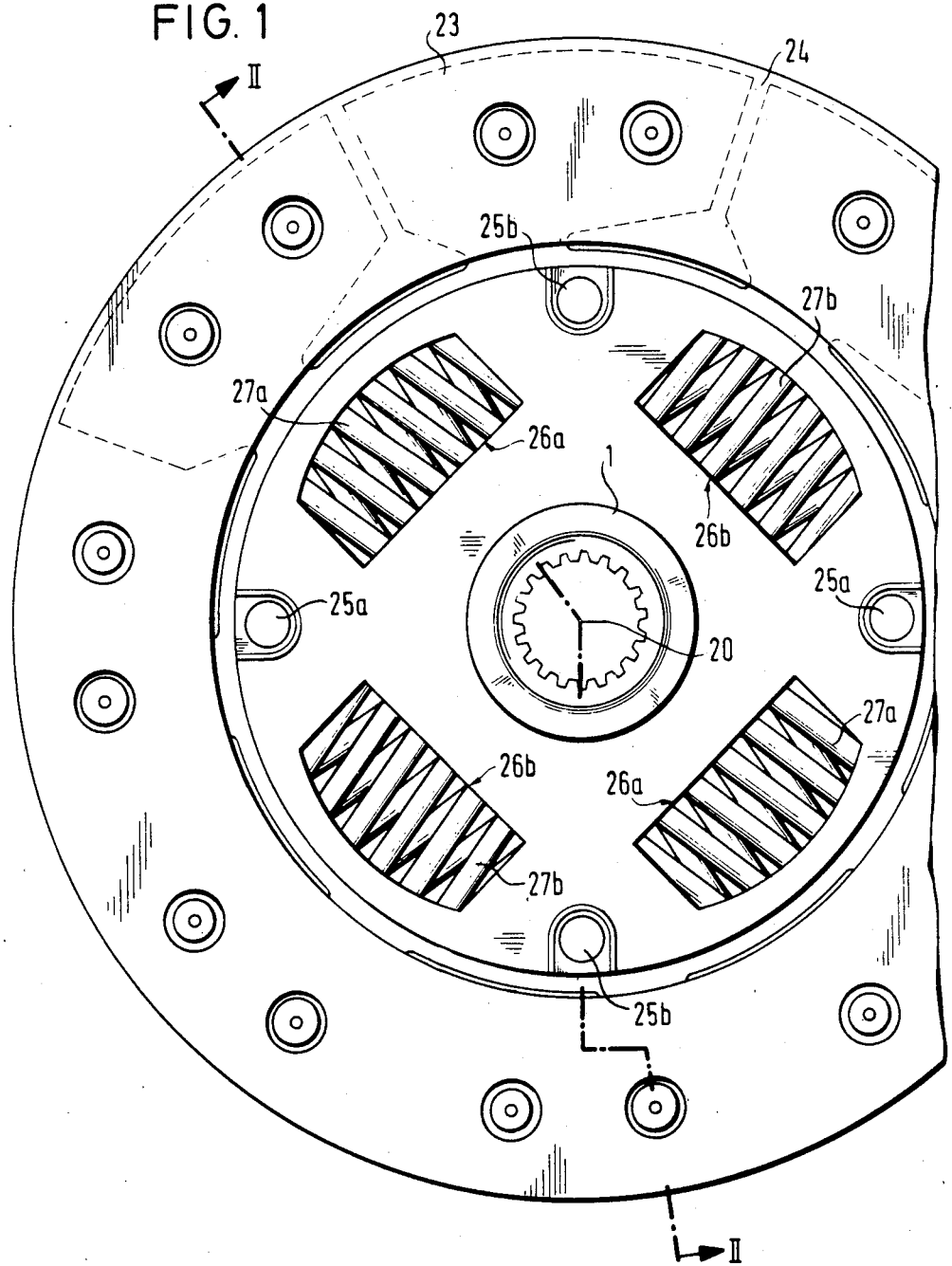
FIG. 1 shows a side view of a clutch disc arrangement as seen from the right-hand side of FIG. 2.
Figure 2:
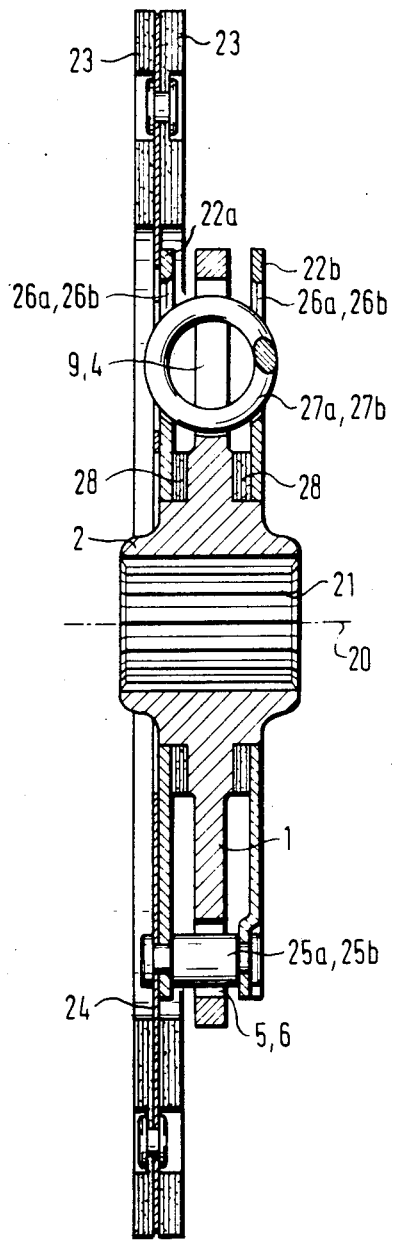
FIG. 2 shows a section according to line II—II of FIG. 1.

In the Figures, 1 denominates a hub flange which is integral with a clutch disc hub 2. The clutch disc hub 2 has an axis 20 and is provided with an internal profile 21 for engagement with a corresponding profile of a gear box input shaft not shown. On both sides of the hub flange 1 there are provided cover plates 22a, 22b. The cover plate 22a is provided with a lining carrier 24 which is provided with friction linings 23. The cover plates 22a, 22b are interconnected by a plurality of interconnection bolts 25a, 25b. The cover plates 22a, 22b are provided with cover plate windows 26a, 26b which receive helical compression springs 27a, 27b. The helical compression springs 27a, 27b are accommodated by hub flange windows 9, 4. The interconnection bolts 25b are received by window type recesses 5. The cover plates 22a, 22b are in frictional engagement with the hub flange through friction rings 28.

Figure 3:
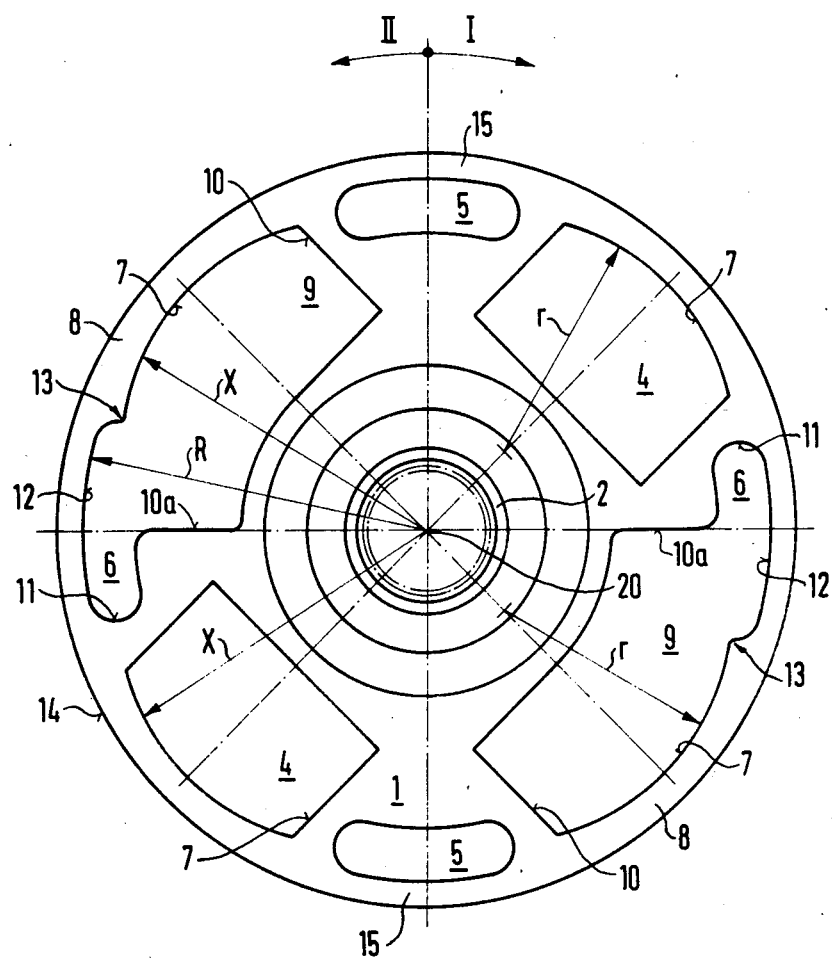
FIG. 3 shows a side view of the hub flange as seen from the right-hand side of FIG. 2.

In FIG. 3, the tractional direction is designated by I and the overrun direction is designated by II. In traction condition torque is transmitted from the lining carrier 24 through the helical compression springs 27a, 27b to the hub flange 1 and the gear input shaft in the direction I. In the overrun condition torque is transmitted from the gear box input shaft through the hub flange 1 and the helical compression springs 27b to the cover plates 22a, 22b and further through the friction linings 23 to the clutch housing and the engine output shaft. In the hub flange 1 there are arranged two diametrically opposite hub flange windows 4 which accommodate compression springs 27b which are loaded in both the overrun and traction directions. The hub flange windows 4 comprise two substantially parallel-extending engagement edges which are spaced from one another in the circumferential direction. Radially outwards the hub flange windows 4 are limited by a circular contour 7 having a radius r which is smaller than the distance X of each point of the contour 7 from the rotation axis 20. Two diametrically oppositely arranged window type recesses 5 are provided offset in the overrun direction II to the hub flange windows 4, and through them there extend, when the clutch disc is complete, interconnecting bolts 25b which function inter alia in combination with the window type recesses 5 as part of angular movement limiting means. The window type recesses 5, in contrast to the prior art, are peripherally closed in that a web 15 is connected, radially outside the window type recesses 5, in both directions of rotation with the material of the hub flange 1. Furthermore, hub flange windows 9 are arranged in the hub flange 1 offset in the overrun direction II in relation to the window type recesses 5, in which hub flange windows 9 compression springs 27a are likewise arranged, the hub flange windows 9 being lengthened in the overrun direction II compared with the hub flange windows 4. In the region of their lengthening they are coherent with bolt-receiving hub flange recesses 6 for interconnection bolts 25a. The hub flange windows 9 likewise have a radially external circular contour 7 formed by a radius r, and again each point of the circular contour 7 is at a distance X from the rotation axis 20 which is greater at every point than the radius r. This circular contour 7 of the hub flange windows 9 merges, seen in the overrun direction II, into a circular contour 12 of the corresponding bolt-receiving hub flange recesses 6. At the transition point a radially outwardly extending shoulder 13 forms. This shoulder 13 is produced in that the circular contour 12 has a radius R from the rotation axis 20 which is greater than the maximum distance X of the circular contour 7 of the hub flange windows 9.

Thus the bolt-receiving hub flange recesses 6 can function not only in the overrun direction II with their circumferentially directed end faces 11 as angular movement limiting means, but also in the traction direction I with the shoulder 13. The circular contours 7 and 12 are radially outwardly defined by webs 8 which combine the hub flange windows 9 and the bolt-receiving hub flange recesses 6 in each case into a closed opening and ensure the circular external contour 14 of the hub flange 1. Thus the hub flange windows 9, which are prolonged in the overrun direction II, are confined in the traction direction I by first lateral edges 10, such as are also provided in principle for the hub flange windows 4, while in the overrun direction II second lateral edges 10a are spaced from the respective ends of the compression springs 27a in the unloaded condition and the hub flange windows 9 merge into the bolt-receiving hub flange recesses 6.

The closed, circular, external contour 14 of the hub flange 1 and all the self-contained openings 4, 5, 9 and 6 result in a compact, heavily loadable hub flange 1. Either it can be loaded with higher torques, while retaining the original material thickness, or with equal loading it can be made thinner and thus lighter.

While a specific embodiment of the invention has been shown and described in detail to illustrate the application of the inventive principles, it will be understood that the invention may be embodied otherwise without departing from such principles.

It is to be noted that the reference numerals in the claims are only provided in view of facilitating the understanding of the claims. These reference numerals are by no means to be understood as restrictive.

What is claimed is:

1. A clutch disc arrangement comprising
   a clutch disc hub (2) having an axis (20);
   a hub flange (1) integral with said clutch disc hub (2);
   two cover plates (22a, 22b) mounted on both sides respectively of said hub flange (1) for angular movement about said axis (20);
   a pair of axially aligned cover plate windows (26a) in respective cover plates (22a; 22b);
   a helical compression spring (27a) located within said cover plate windows (26a) in a position substantially tangential with respect to said axis (20) and engaging by its ends substantially radially extending terminal edges of said cover plate windows (26a);
   a spring-receiving hub flange recess (9) accommodating said helical compression spring (27a) and having a first substantially radially extending lateral edge (10) adjacent one end of said helical compression spring (27a) in the unloaded condition of said hub disc arrangement and a second lateral edge (10a) being spaced from the opposite end of said helical compression spring (27a) in said unloaded condition;
   at least one substantially axially extending interconnection bolt (25a) interconnecting said cover plates (22a, 22b);
   a bolt receiving hub flange recess (6) in said hub flange (1) adjacent said second lateral edge (10a) of said spring-receiving hub flange recess (9) and accommodating said interconnection bolt (25a) such as to establish with said interconnection bolt (25a) angular movement limiting means;
   said bolt-receiving hub flange recess (6) being coherent with said spring-receiving hub flange recess (9) within said hub flange (1),
   said spring-receiving hub flange recess (9) and said bolt-receiving hub flange recess (6) defining a peripherally closed hub flange window (9 - 6) which is at the radially outer side thereof closed by a radially outer, circumferentially uninterrupted web (8), said web having (8) a reduced radial width adjacent the area of said bolt-receiving hub flange recess (6) and an increased radial width adjacent the area of said spring-receiving hub flange recess (9), a shoulder (13) being defined at the transition between said reduced and said increased radial width, said shoulder (13) defining a circumferentially acting abutment for said interconnection bolt (25a), said abutment and said interconnection bolt (25a) establishing part of said angular movement limiting means for a tractional direction (I) of loading transmission through said cluch disc arrangement.

2. A clutch disc arrangement as set forth in claim 1, said peripherally closed hub flange window (9 - 6) comprising a circumferential extension (6) of reduced radial width adjacent said second lateral edge (10a) and said radially outer web (8), said extension (6) having a circumferentially directed end face (11), said end face (11) establishing together with said interconnection bolt (25a) a part of said angular movement limiting means for an overrun direction (II) of load transmission through said clutch disc arrangement.

3. A clutch disc arrangement as set forth in claim 1, said hub flange (1) being provided with a diagonally opposed pair of said hub flange windows (9 - 6) accommodating a pair of said helical compression springs (27a) respectively.

4. A clutch disc arrangement as set forth in claim 3, said hub flange (1) being provided with a pair of further diagonally opposed, peripherally closed hub flange windows (4) for receiving a pair of further helical compression springs (27b), said further hub flange windows (4) being located each between subsequent ones of said hub flange windows (9 - 6).

5. A clutch disc arrangement as set forth in claim 4, said hub flange (1) being provided with a pair of further diagonally opposed bolt-receiving hub flange recesses (5) for accommodating two further interconnection bolts (25b) respectively, said further bolt-receiving hub flange recesses (5) being of the peripherally closed window type and being located each circumferentially between one of said hub flange windows (9 - 6) adjacent the first lateral edge (10) thereof and one of said further hub flange windows (4) respectively.

6. A clutch disc arrangement as set forth in claim 1, said radially outer web (8) having a radially outer edge following a circular circumferential edge (14) of said hub flange (1) and a radially inner edge (7, 12) following at least one circle (X, R).

* * * * *